Oct. 26, 1965  J. P. THOMPSON  3,213,500

FASTENER

Filed Nov. 12, 1963

INVENTOR.
John P. Thompson
BY
J. D. Douglas
His ATTORNEY

United States Patent Office 3,213,500
Patented Oct. 26, 1965

3,213,500
FASTENER
John P. Thompson, Fairview Park, Ohio, assignor to Master Mold & Die Company, Cleveland, Ohio, a corporation of Ohio
Filed Nov. 12, 1963, Ser. No. 322,701
3 Claims. (Cl. 24—73)

This invention relates to fasteners and more particularly to a fastener which has one portion that may be inserted into an aperture in a thin wall and becomes locked in place and has means disposed on the front side of the wall for holding an article on or in spaced relation to the wall.

More particularly the device is especially useful in conjunction with thin walled structures where a wire or tube extends from one place to the other and it is desired to hold the wire or tube in a predetermined position on the wall of the structure.

The present device is particularly useful in that it may be made very cheaply of a plastic such as one of the polyvinyl chlorides, nylon, polypropylene, etc.

One particular advantage of the device is that it may be inserted in the apertured wall without the use of any special tools or may be inserted by hand. It can also be quickly and easily removed with a pair of pliers. Another advantage resides in the fact that although easily inserted, it will not rattle around in the aperture after insertion and holds the article firmly.

Still other advantages of the invention, and the invention itself, will become more apparent from the following description of an embodiment thereof, which description is illustrated by the accompanying drawings and forms a part of this specification.

Figure 1:
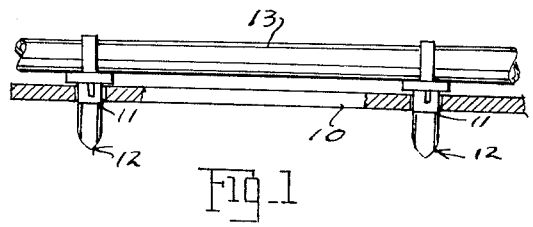
FIG. 1 is an elevational view of a pair of the fastener devices inserted in an apertured board, parts of which are shown in section, and showing a tube supported by the fastener.

Referring now to the drawings, in FIG. 1 there is illustrated a fragment of a board 10 which has apertures 11 formed therein and wherein the fasteners 12 are shown in place and holding a fragment of a tube 13 in spaced relation to the board.

Figure 2:
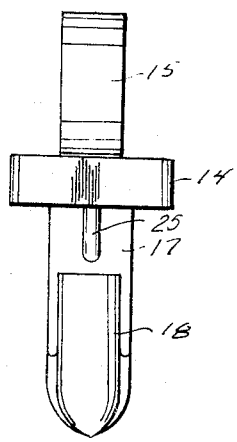
FIG. 2 is an enlarged elevational view of one of the fasteners.
Figure 3:
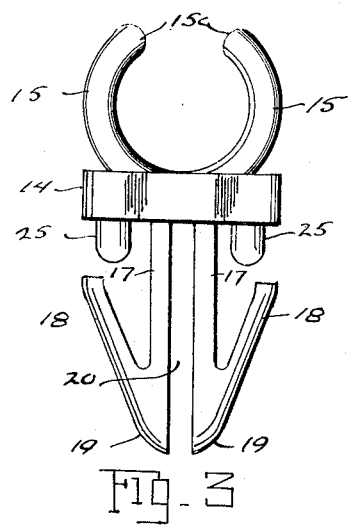
FIG. 3 is a view at 90° from that shown in FIG. 2.
Figure 4:
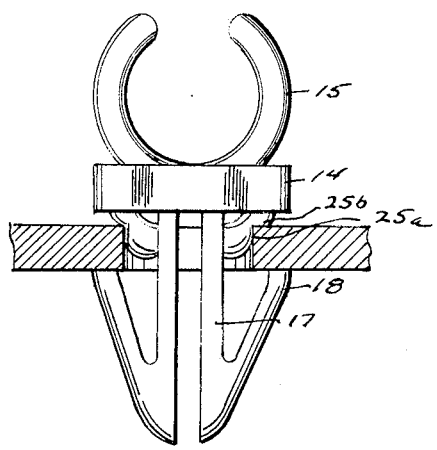
FIG. 4 is an enlarged view of the fastener of FIG. 3 in position in an aperture in a board.

Referring to FIGS. 2-4 inclusive, the fastener includes a base 14, which may be square, round or other shape, in plan, and of material thickness. Extending upward or outward from one side of the base are a pair of curved arms 15 of general C shape. The arms are preferably wider than they are thick, to lend a degree of flexibility thereto. The curvature of the arms is on a radius which may be slightly less than the radius of the article which is to be held, provided it is a tube or wire. Obviously instead of arms other means may be designed to hold articles of different shapes. For instance, the arms could be shaped to hold a square article, or a head could be substituted similar to a nail head. The article, if it be a tube or wire, may have its end inserted between the arms and slid therethrough, or the flexibility is such that the article may be slid between the opposite ends 15a, the ends being forced apart and returning to their original position, gripping the article when the article is in place.

Extending from the bottom of the base, as viewed in the figures, are a pair of spaced apart stem portions 17 which are preferably rectangular in cross section, to provide flexibility and enable them to be easily bent toward each other. The stem portions, near their ends, merge with a pair of backwardly and outwardly extending arms 18. These arms are also wider than they are thick. The upper extremities of these arms are spaced apart, on opposite sides a distance greater than the diameter of the aperture into which they are to be inserted.

The arms are preferably provided with an outer surface formed on a radius, although they could be without transverse curvature. The stems and arms merge together at their bottom ends and the exterior of the merging portion is curved inwardly at 19, toward the kerf 20. This provides a generally pointed end, which is smaller than the aperture 11, whereby the point may be inserted in the aperture and the fastener pressed home, during which insertion movement the stems 17 move toward each other to close the kerf, and the arms 18 may bend until they are inward of the wall of the aperture. After the arms pass through the aperture they spring back to their original position and engage with the back side of the wall, as shown in FIG. 4.

It will be noted that the ends of the arms 18 are spaced from the base 14 a distance which should be larger than the thickness of the wall to which they are attached. This is to enable the device to be attached easily and quickly and to enable the device to be pushed into the aperture far enough so that the arms may easily clear the wall, and, to enable a single design of fastener to be used with walls of different thicknesses.

In order to prevent the device from moving around in the aperture and from sliding backward and forward in the aperture, easily deformable means is provided to hold the device in position and against movement of the base toward and from the wall. It comprises a pair of projections 25 extending downwardly from the base 14 in spaced relation to the stems 17, each of which is disposed opposite to the adjacent stem. The projections are each of generally rectangular cross section, with their narrow dimension at right angles to the wider dimension of the stem. The ends are rounded, as best shown in FIG. 3. These projections could also be attached to the stems 17 or closely disposed adjacent the stems 17 in substantial contact therewith.

When the fastener is pushed home, the projections engage wtih the wall of the aperture and are distorted. This provides a resilient means which prevents movement to and from the wall. FIG. 4 shows one form of distortion wherein the part 25a of the projection extends into and engages with the aperture wall, and another portion 25b engages with the outer wall. In some instances, the material ultimately cold flows outwardly, depending upon the size of the aperture. The result is that the part from 25b to the base provides a resilient abutment between the outer wall of the panel 10 and the base 14 and the part 25a prevents lateral movement. Thus the projections hold the arms 18 against the back side of the panel, hold the base 14 spaced from the panel, and hold the stems 17 centered in the aperture.

It will be apparent that the above device may be quickly and easily inserted. When it is desired to remove the same, the arms 18 and stems 17 need only be pinched together and pushed through and free of the aperture.

Having thus described the invention, I am aware that numerous and extensive departures may be made therefrom, without departing from the spirit or scope of the invention as defined by the appended claims.

I claim:

1. In combination with a board formed to provide an aperture, a fastener for insertion in the aperture and for holding an article spaced from the surface of the board comprising a body, a pair of spaced stem portions extending from said body through the aperture and beyond the wall of the aperture, said stem portions each being provided with a resilient backwardly extending portion having an end extending beyond the wall of the aperture and engaging the board adjacent the aperture, and projections spaced from said stem portion and having the outer surfaces thereof spaced apart a distance greater than the aperture and their inner surfaces less than the aperture, said projections being sufficiently long that they are pressed into the aperture and are deformed by the wall of the aperture to prevent the fastener from freely moving when inserted.

2. In combination with a board formed to provide an aperture, a fastener for insertion in the aperture and for holding an article spaced from the surface of the board comprising a body, a pair of spaced stem portions extending from said body through the aperture and beyond the wall of the aperture, said stem portions each being provided with a resilient backwardly extending portion having an end extending beyond the wall of the aperture and engaging the board adjacent the aperture, and a pair of projections spaced from said stem portion and having the outer surfaces thereof spaced apart a distance greater than the aperture and their inner surfaces less than the aperture, said projections being sufficiently long that they are pressed into the aperture and are deformed by the wall of the aperture to prevent the fastener from freely moving when inserted.

3. A fastener as described in claim 2, wherein said projections are thinner than they are wide, to permit ready deformation thereof.

References Cited by the Examiner
UNITED STATES PATENTS

| | | |
|---|---|---|
| 1,965,882 | 7/34 | Cook. |
| 2,128,005 | 8/38 | Lombard. |
| 2,758,498 | 8/56 | Johnson _____ 24—213 X |
| 2,836,215 | 5/58 | Rapata. |

WILLIAM FELDMAN, *Primary Examiner.*

DONLEY J. STOCKING, *Examiner.*